(12) United States Patent
Chung et al.

(10) Patent No.: US 12,175,884 B2
(45) Date of Patent: Dec. 24, 2024

(54) CARDIOPULMONARY RESUSCITATION TRAINING APPARATUS FOR INFANTS

(71) Applicant: Innosonian Inc., Seoul (KR)

(72) Inventors: Mok Chung, Seoul (KR); Woong Hur, Seoul (KR); Nam Hun Kim, Incheon (KR); Ho Gil Han, Seoul (KR)

(73) Assignee: Innosonian Inc., Seoul (KR)

( * ) Notice: Subject to any disclaimer, the term of this patent is extended or adjusted under 35 U.S.C. 154(b) by 754 days.

(21) Appl. No.: 17/305,376

(22) Filed: Jul. 6, 2021

(65) Prior Publication Data
US 2022/0005377 A1   Jan. 6, 2022

(30) Foreign Application Priority Data
Jul. 6, 2020   (KR) .................. 10-2020-0082699

(51) Int. Cl.
*G09B 23/28* (2006.01)
(52) U.S. Cl.
CPC .................. *G09B 23/288* (2013.01)
(58) Field of Classification Search
CPC .................................. G09B 23/288
USPC ........................................ 434/265
See application file for complete search history.

(56) References Cited

U.S. PATENT DOCUMENTS

| 4,611,998 A * | 9/1986 | Ramamurthy | ....... G09B 23/288 434/265 |
| 5,286,206 A * | 2/1994 | Epstein | ................ G09B 23/288 434/265 |
| 6,227,864 B1 | 5/2001 | Egelandsdal et al. | |

(Continued)

FOREIGN PATENT DOCUMENTS

| JP | 2013088453 A | * | 5/2013 |
| JP | 5475738 B2 | | 4/2014 |
| KR | 100887375 B1 | | 3/2009 |

(Continued)

*Primary Examiner* — Jay Trent Liddle
*Assistant Examiner* — Alyssa N Brandley
(74) *Attorney, Agent, or Firm* — Downs Rachlin Martin PLLC

(57) ABSTRACT

A cardiopulmonary resuscitation (CPR) training apparatus for infants is disclosed. The CPR training apparatus for infants includes a body portion, a head portion including a head frame rotatably connected to the body portion, a tunnel portion including a tunnel frame installed on a neck of the body portion, and a lower catching protrusion extending from a lower side of the tunnel frame to an upper side of the tunnel frame, an airway portion including an airway tube installed to be in communication with a mouth of the head portion, and a neutral closure portion connected to an outside of the airway tube so as to be positioned above the lower catching protrusion, and a tube portion configured to connect the airway tube and an artificial lung to each other by passing through the tunnel portion between the lower catching protrusion and the neutral closure portion. The neutral closure portion may be in contact with the lower catching protrusion to close the tube portion when the head portion is in a neutral state with respect to the body portion, and the neutral closure portion may be spaced apart from the lower catching protrusion to open the tube portion when the head portion is tilted at a predetermined angle or more with respect to the body portion.

11 Claims, 8 Drawing Sheets

(56) References Cited

U.S. PATENT DOCUMENTS 6,780,017 B2 * 8/2004 Pastrick ............... G09B 23/288
                                                        434/262
2020/0211421 A1 * 7/2020 Haller ................... G09B 23/32

FOREIGN PATENT DOCUMENTS

| KR | 20130026960 A | 3/2013 |
|---|---|---|
| KR | 101298488 B1 | 8/2013 |
| KR | 101856203 B1 | 5/2018 |
| KR | 101981742 B1 | 5/2019 |
| KR | 101995675 B1 | 7/2019 |
| KR | 102014533 B1 | 8/2019 |

* cited by examiner

CARDIOPULMONARY RESUSCITATION TRAINING APPARATUS FOR INFANTS

CROSS-REFERENCE TO RELATED APPLICATION(S)

Related Application Data

This application claims the priority benefit of Korean Patent Application No. 10-2020-0082699 filed on Jul. 6, 2020, in the Korean Intellectual Property Office, the disclosure of which is incorporated herein by reference for all purposes.

FIELD OF THE INVENTION

Example embodiments relate to a cardiopulmonary resuscitation (CPR) training apparatus for infants.

BACKGROUND

Cardiopulmonary resuscitation (CPR) is an emergency procedure to resuscitate a patient who has slowed or stopped cardiopulmonary function by restoring the cardiopulmonary function. CPR circulates blood when the heart is paralyzed, so that it is critical to helping to delay damage to the brain and recover the paralyzed heart. The method of CPR depends on whether the target is an adult, child, or infant. Therefore, it is important to acquaint yourself with CPR for each target in advance. In general, the CPR education is conducted through two-dimensional education such as display education or booklets, and thus there is a limit in that it cannot be effectively delivered to trainees. In order to increase a learning effect, there is a need for a training apparatus that enables CPR training in a situation similar to an actual situation.

In case of infants, extra attention is required because CPR for infants is partially different from that for adults. For example, in case of infants, it is required to tilt the head slightly to open the airway, and tilting the head excessively may block the airway. Therefore, an additional CPR training apparatus for infants is required.

The above-described background technology is possessed or acquired by the inventor(s) in a process of deriving the example embodiments, and is not necessarily a known technology disclosed to the general public prior to filing of the present application.

SUMMARY OF THE DISCLOSURE

An aspect provides a cardiopulmonary resuscitation (CPR) training apparatus for infants that may provide an environment similar to an actual CPR situation for infants.

Another aspect provides a CPR training apparatus for infants in which an airway is opened only when a head is slightly tilted and the airway is closed in a neutral position or when the head is excessively tilted.

Still another aspect provides a CPR training apparatus for infants in which a chin may be raised.

According to an aspect, there is provided a CPR training apparatus for infants including a body portion, a head portion including a head frame rotatably connected to the body portion, a tunnel portion including a tunnel frame installed on a neck of the body portion, and a lower catching protrusion extending from a lower side of the tunnel frame to an upper side of the tunnel frame, an airway portion including an airway tube installed to be in communication with a mouth of the head portion, and a neutral closure portion connected to an outside of the airway tube so as to be positioned above the lower catching protrusion, and a tube portion configured to connect the airway tube and an artificial lung to each other by passing through the tunnel portion between the lower catching protrusion and the neutral closure portion. The neutral closure portion may be in contact with the lower catching protrusion to close the tube portion when the head portion is in a neutral state with respect to the body portion, and the neutral closure portion may be spaced apart from the lower catching protrusion to open the tube portion when the head portion is tilted at a predetermined angle or more with respect to the body portion.

The tunnel portion may further include an upper catching protrusion extending from the upper side of the tunnel frame to the lower side of the tunnel frame. The airway portion may further include a hyperextension closure portion connected to the outside of the airway tube so as to be positioned below the upper catching protrusion. The tube portion may pass through the tunnel portion between the upper catching protrusion and the hyperextension closure portion. The hyperextension closure portion may be spaced apart from the upper catching protrusion to open the tube portion when the head portion is tilted at an angle less than a hyperextension angle with respect to the body portion, and the hyperextension closure portion may be in contact with the upper catching protrusion to close the tube portion when the head portion is tilted at the hyperextension angle or more with respect to the body portion.

The tube portion may be closed when the head portion is in the neutral state with respect to the body portion. The tube portion may be opened when the head portion is tilted at the predetermined angle or more and the angle less than the hyperextension angle with respect to the body portion. The tube portion may be closed when the head portion is tilted at the hyperextension angle or more with respect to the body portion.

The airway portion may further include a connection frame configured to connect the neutral closure portion and the hyperextension closure portion to the outside of the airway tube.

The neutral closure portion may be positioned relatively above and behind the hyperextension closure portion.

The lower catching protrusion may be positioned relatively behind the tunnel portion in comparison to the upper catching protrusion.

An extended length of the upper catching protrusion may be longer than an extended length of the lower catching protrusion.

A sum of lengths of the upper catching protrusion and the lower catching protrusion may be less than a diameter of the tunnel frame.

The tunnel portion may further include a head coupling portion protruding from an outside of the tunnel frame to each of opposite sides of the tunnel frame. The head portion may further include a head coupling hole formed through each of opposite sides of a lower end of the head frame so that the head coupling portion is inserted.

The head portion may be rotatable with respect to the body portion and the tunnel portion using the head coupling portion and the head coupling hole as a central axis.

The head portion may further include a chin frame connected to the lower end of the head frame so as to be translatable in a vertical direction with respect to the head frame.

The head portion may further include a guide groove formed in a longitudinal direction at each of opposite lower ends of the chin frame, and a chin coupling portion protruding from each of opposite lower ends of the head frame, the chin coupling portion coupled to the guide groove.

According to another aspect, there is provided a CPR training apparatus for infants including a body portion, a head portion including a head frame rotatably connected to the body portion, a tunnel portion including a tunnel frame installed on a neck of the body portion, and an upper catching protrusion extending from an upper side of the tunnel frame to a lower side of the tunnel frame, an airway portion including an airway tube installed to be in communication with a mouth of the head portion, and a hyperextension closure portion connected to an outside of the airway tube so as to be positioned below the upper catching protrusion, and a tube portion configured to connect the airway tube and an artificial lung by passing through the tunnel portion between the upper catching protrusion and the hyperextension closure portion. The hyperextension closure portion may be spaced apart from the upper catching protrusion to open the tube portion when the head portion is tilted at an angle less than a hyperextension angle with respect to the body portion, and the hyperextension closure portion may be in contact with the upper catching protrusion to close the tube portion when the head portion is tilted at the hyperextension angle or more with respect to the body portion.

The CPR training apparatus for infants according to aspects may provide an environment similar to an actual CPR situation for infants.

The CPR training apparatus for infants according to aspects may open an airway thereof only when a head thereof is slightly tilted, and may close the airway in a neutral position or when the head is excessively tilted, thereby training a correct posture.

The CPR training apparatus for infants according to aspects may include a structure capable of raising a chin thereof, thereby creating an environment similar to an actual environment.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
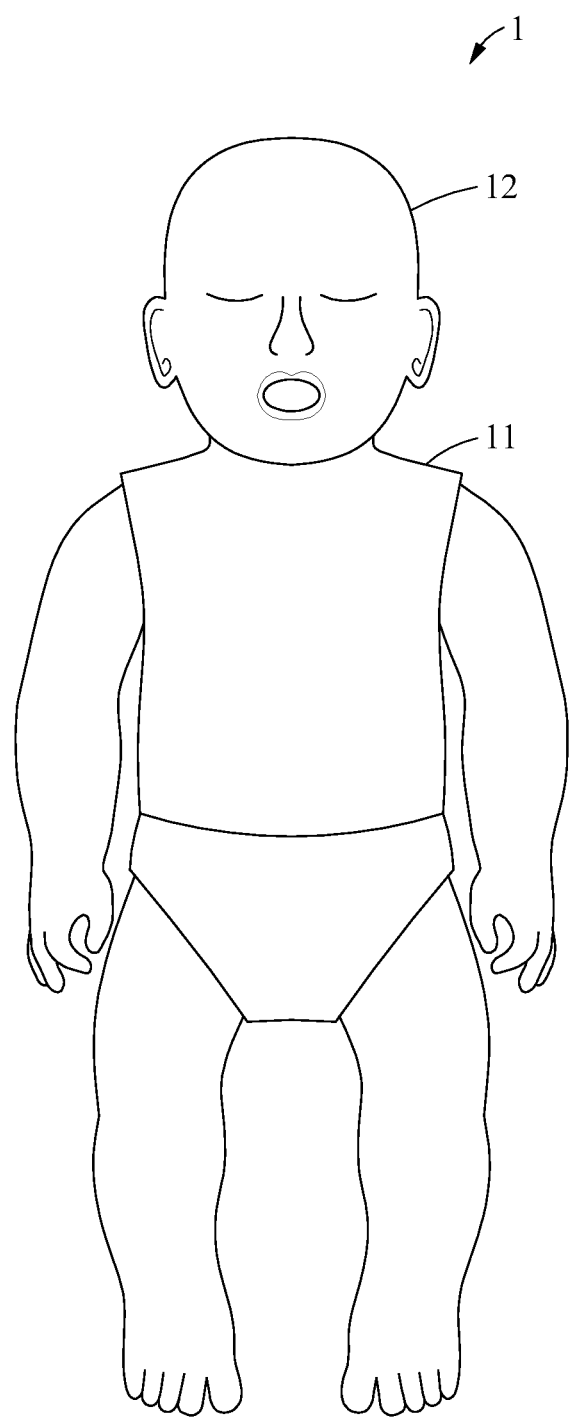
FIG. 1 is a schematic plan view of a cardiopulmonary resuscitation (CPR) training apparatus for infants according to an example embodiment.

Hereinafter, example embodiments will be described in detail with reference to the accompanying drawings. The scope of the right, however, should not be construed as limited to the example embodiments set forth herein. Various modifications may be made to the example embodiments. Here, examples are not construed as limited to the example embodiments and should be understood to include all changes, equivalents, and replacements within the idea and the technical scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood, that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by those skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the components in the drawings, it should be noted that the same components will be designated by the same reference numerals, wherever possible, even though they are shown in different drawings. Further, in the description of example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to", "coupled to", or "linked to" another component, one component may be "connected to", "coupled to", or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

Cardiopulmonary resuscitation (CPR) performed on infants will be briefly described. CPR for infants may be performed when they have no consciousness or breathing, when they have no voluntary movement, and when they have abnormal breathing or convulsive seizures. First, it is required to lay the infant on his/her back and lightly tap the sole of his/her foot to check whether he/she is conscious and breathing normally. Then, it is required to ask surrounding people for help, such as calling 911. Next, it is required to perform chest compressions. After bringing index and middle fingers together, it is required to bring first joints of the fingers into contact with the infant's sternum. A position to be compressed is the area right below the center of the line connecting both nipples of the infant. It is required to place the fingers perpendicular to the area that is in contact with the sternum, and to press firmly and quickly. Next, it is required to perform artificial respiration. It is required to raise the infant's chin with one hand so that his/her ears are parallel to the floor, and to tilt his/her head back with the other hand. It is required to perform artificial respiration by simultaneously blowing in the infant's mouth and nose so that his/her chest elevation is visually observed. It is required to repeat chest compressions and artificial respiration indefinitely until paramedics arrive. In performing CPR on infants, an appropriate chest compression depth and speed are required.

FIG. 1 is a schematic plan view of a CPR training apparatus for infants according to an example embodiment.

A CPR training apparatus for infants 1 according to an example embodiment may be used for CPR training for infants. In performing CPR on infants, it may be important to perform artificial respiration in a correct posture. In particular, CPR for infants is different from CPR for adults in that the infant's airway may be opened only when his/her head is tilted slightly, and the airway may be closed when the head is excessively tilted. Therefore, the CPR training apparatus for infants 1 may be configured such that the airway is opened only when the head is tilted in a predetermined range. Accordingly, a user may practice artificial respiration in a situation similar to a situation in which artificial respiration is performed on an actual infant, thereby increasing a training effect.

Figure 2:
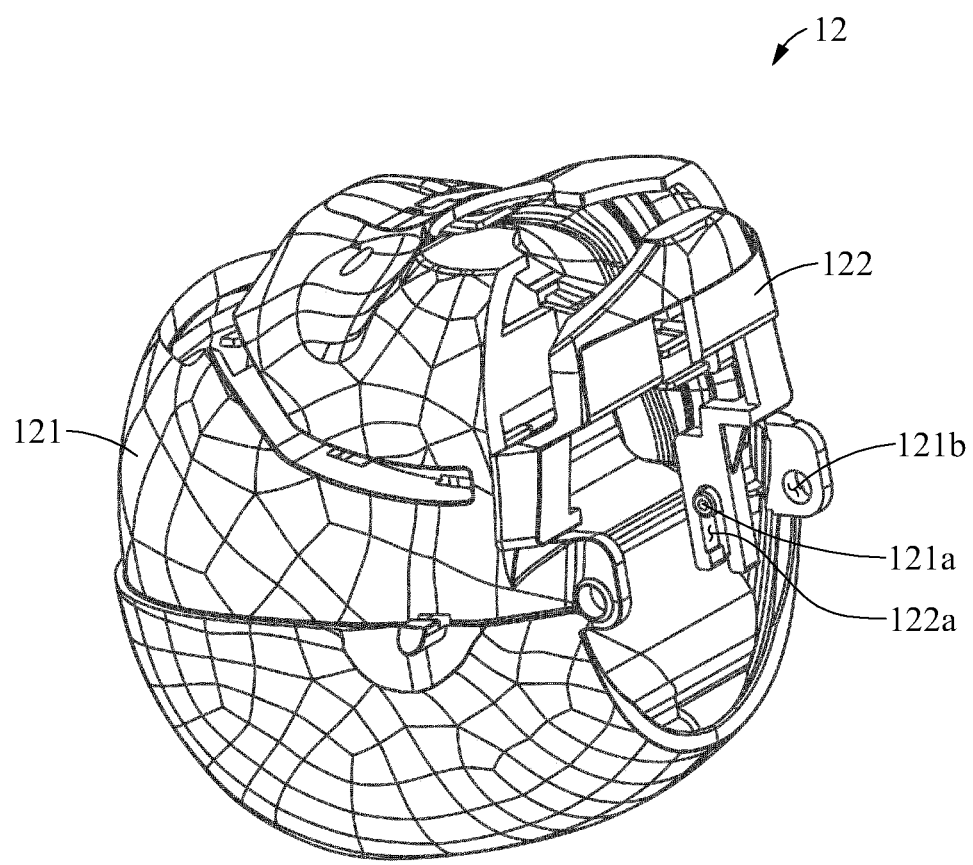
FIG. 2 is an assembled perspective view of a head portion according to an example embodiment.
Figure 3:
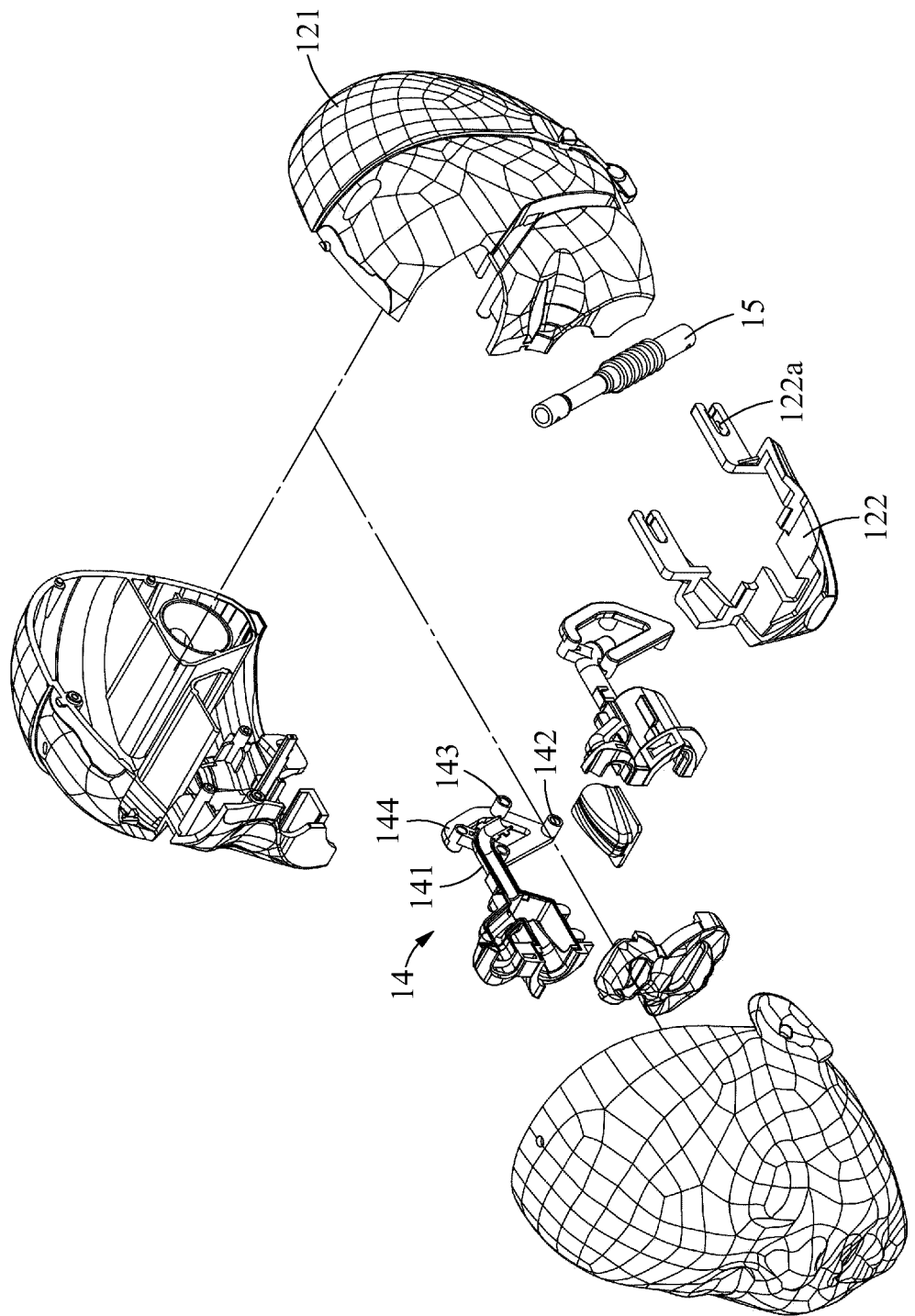
FIG. 3 is an exploded perspective view of a head portion, an airway portion, and a tube portion according to an example embodiment.
Figure 4:
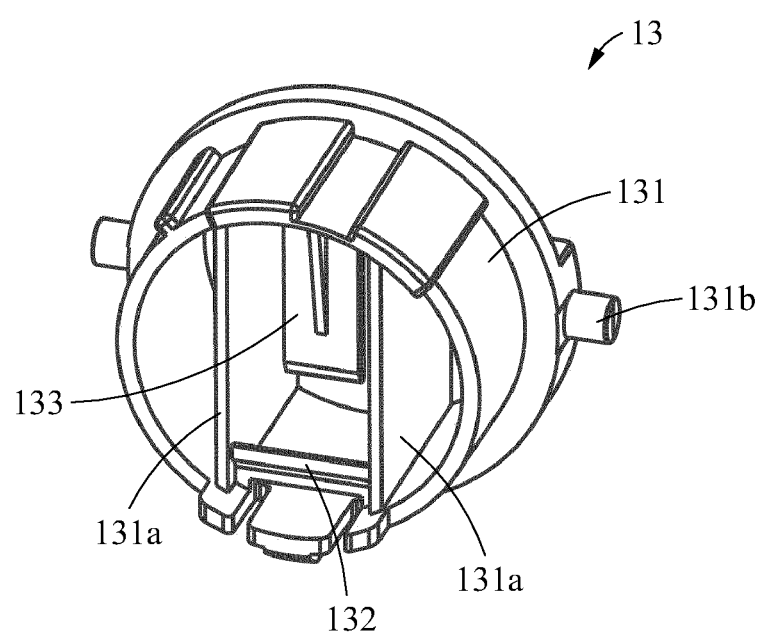
FIG. 4 is a perspective view of a tunnel portion according to an example embodiment.
Figure 5:
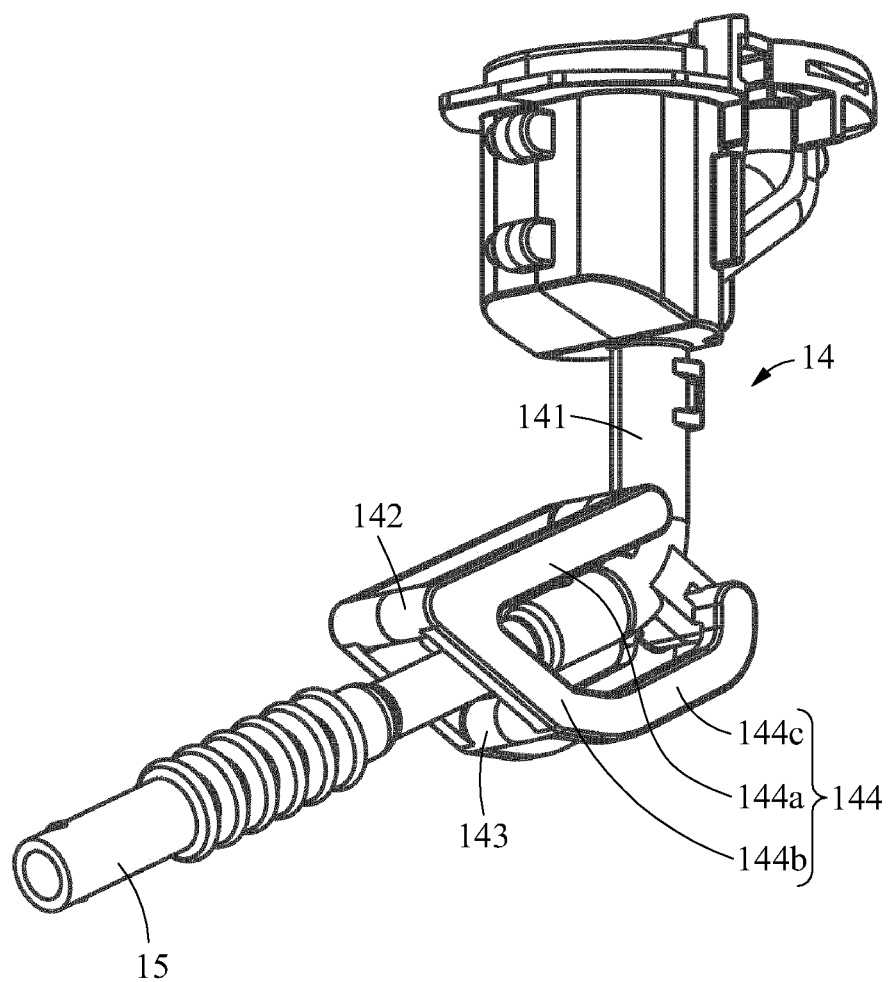
FIG. 5 is a perspective view of an airway portion and a tube portion according to an example embodiment.

FIG. 2 is an assembled perspective view of a head portion according to an example embodiment. FIG. 3 is an exploded perspective view of a head portion, an airway portion, and a tube portion according to an example embodiment. FIG. 4 is a perspective view of a tunnel portion according to an example embodiment. FIG. 5 is a perspective view of an airway portion and a tube portion according to an example embodiment.

Referring to FIGS. 1 to 5, the CPR training apparatus for infants 1 according to an example embodiment may include a body portion 11, a head portion 12, a tunnel portion 13, an airway portion 14, and a tube portion 15.

Referring to FIG. 1, the body portion 11 may constitute a body portion of an infant mannequin. The body portion 11 may be formed in a shape similar to that of an infant's body. The body portion 11 may have an external shape based on a standard body shape of the infant so that a user performing training has a feeling of a situation similar to an actual situation. The body portion 11 may include a torso, arms, and legs. An appearance of the body portion 11 may be formed to have shapes such as a xiphoid process, ribs, nipples, and the like. According to such a structure, when the user performs chest compression on the body portion 11, an exact chest compression position may be verified. The body portion 11 may include a space therein. A component for CPR or artificial respiration training may be disposed inside the body portion 11. For example, an artificial lung may be disposed inside the body portion 11. The body portion 11 may be formed to be openable for installation, replacement, or inspection of the component installed therein.

Referring to FIGS. 1 to 3, the head portion 12 may constitute a head portion of the infant mannequin. The head portion 12 may be rotatably connected to the body portion 11. A detailed description of connection between the head portion 12 and the body portion 11 will be described later.

The head portion 12 may include a head frame 121 and a chin frame 122.

The head frame 121 may be formed in a shape similar to that of the infant's head. The head frame 121 may have an external shape based on the standard body shape of the infant so that a user performing training has a feeling of a situation similar to an actual situation. The head frame 121 may have eyes, a nose, and a mouth. The head frame 121 may include a space therein. A component for CPR or artificial respiration training may be disposed inside the head frame 121. The head frame 121 may be formed to be openable for installation, replacement, or inspection of the component installed therein. For example, the head frame 121 may include a left head and a right head, and the heads may be coupled to each other or separated from each other in a horizontal direction.

The chin frame 122 may be formed in a shape similar to that of the infant's chin. The chin frame 122 may have an external shape based on the standard body shape of the infant so that the user performing training has a feeling of a situation similar to an actual situation. The chin frame 122 may be connected to a lower end of the head frame 121 so as to be translatable in a vertical direction with respect to the head frame 121. Here, the vertical direction may refer to a direction perpendicular to the ground based on a state in which the CPR training apparatus for infants 1 is laid on the floor. For example, the chin frame 122 may include guide grooves 122a formed in portions extending in a longitudinal direction from each of opposite lower ends thereof, and the head frame 121 may include chin coupling portions 121a formed to protrude inward from each of the opposite lower ends. The chin coupling portion 121a may be slidably coupled to the guide groove 122a to connect the chin frame 122 to and the head frame 121 to each other. According to such a structure, the chin frame 122 may be translatable with respect to the head frame 121 along a longitudinal direction of the guide groove 122a. Accordingly, the chin frame 122 may be pulled or recede from the head frame 121 in a similar manner to an actual human body, and thus the user may perform an operation of pulling the chin during CPR. In particular, since the infant's tongue is attached to the chin, the airway is opened only when the chin is pulled. In this regard, the CPR training apparatus for infants 1 may provide an environment similar to an actual environment, thereby increasing a learning effect.

Figure 6:
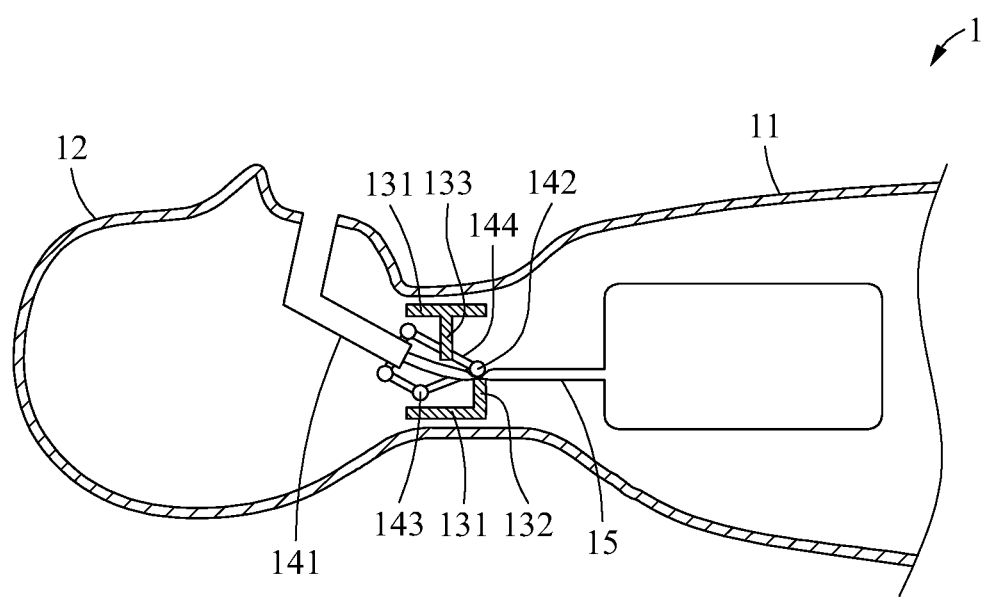
FIGS. 6 to 8 are schematic cross-sectional views of a CPR training apparatus for infants according to an example embodiment, the views illustrating a relative positional relationship between a tunnel portion and an airway portion based on an angle at which a head portion is tilted with respect to a body portion and whether a tube portion is opened or closed.
Figure 7:
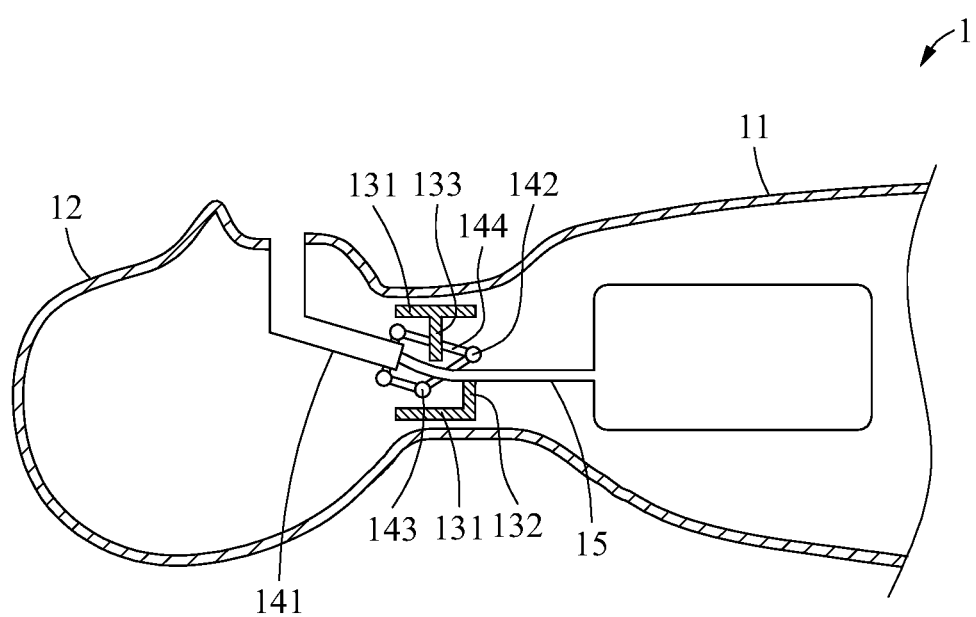
Figure 8:
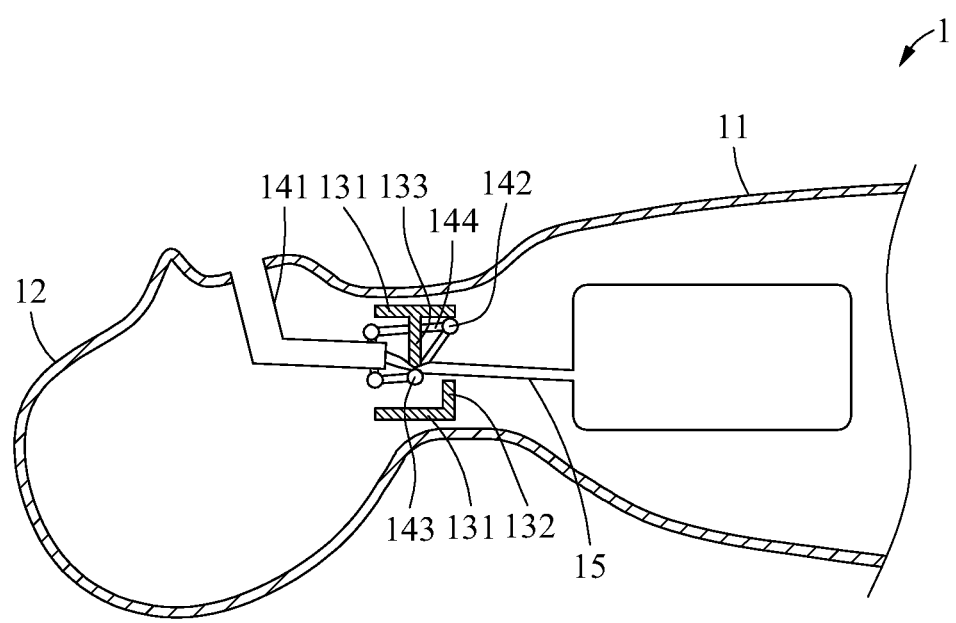

FIGS. 6 to 8 are schematic cross-sectional views of a CPR training apparatus for infants according to an example embodiment, the views illustrating a relative positional relationship between a tunnel portion and an airway portion based on an angle at which a head portion is tilted with respect to a body portion and whether a tube portion is opened or closed.

Referring to FIGS. 4 and 6 to 8, the tunnel portion 13 may be installed on a neck of the body portion 11. The tunnel portion 13 may have a through-space therein, and the through-space may provide a path that connects the inside of the head portion 12 and the inside of the body portion 11 to each other. The airway portion 14 and the tube portion 15 to be described later may be connected to an artificial lung positioned inside the body portion 11 through the tunnel portion 13. The tunnel portion 13 may mediate connection between the head portion 12 and the body portion 11.

The tunnel portion 13 may include a tunnel frame 131, a lower catching protrusion 132, and an upper catching protrusion 133.

The tunnel frame 131 may include a hollow cylindrical frame. The tunnel frame 131 may be formed to have a size and shape corresponding to those of the neck of the body portion 11, and thus may be fixedly installed on the neck of the body 11.

In order to increase rigidity, the tunnel frame 131 may include a pair of vertical walls 131a that vertically connect upper and lower sides of an inner through-space to each other. The pair of vertical walls 131a may be positioned to be spaced apart from each other by a predetermined distance.

The tunnel frame 131 may include a head coupling portion 131b protruding from the outside to each of opposite sides thereof. The head coupling portion 131b may be exposed to the outside in a state in which the tunnel frame 131 is coupled to the body portion 11. The head frame 121 may include a head coupling hole 121b that is formed through or recessed at each of opposite lower ends of the head frame 121 so that the head coupling portion 131b is inserted. As the head coupling portion 131b is inserted into the head coupling hole 121b, the head frame 121 may be connected to the tunnel frame 131. According to such a structure, the head frame 121 may be rotatable with respect to the body portion 11 and the tunnel portion 13 using the head coupling portion 131b and the head coupling hole 121b as a central axis. That is, the head portion 12 may be relatively tilted or pulled with respect to the body portion 11 around the head coupling portion 131b and the head coupling hole 121b. A coupling portion may be formed to protrude from the head frame 121, and a coupling hole may be formed through or recessed in the tunnel portion 13.

A lower catching protrusion 132 may extend from a lower side of tunnel frame 131 to an upper side of the tunnel frame 131. An upper catching protrusion 133 may extend from the upper side of the tunnel frame 131 to the lower side of the tunnel frame 131. The upper and lower sides may refer to upper and lower sides in a direction perpendicular to the ground, based on a state in which the CPR training apparatus for infants 1 is laid on the ground.

The lower catching protrusion 132 may be relatively formed at a rear end of the tunnel frame 131 in comparison to the upper catching protrusion 133. The front and rear may respectively refer to a head side and a foot side in a height direction of a mannequin, based on a state in which the CPR training apparatus for infants 1 is laid on the ground. For example, the lower catching protrusion 132 may be formed on a rear end portion of the tunnel frame 131, and the upper catching protrusion 133 may be formed on a front end portion or a middle portion of the tunnel frame 131.

An extended length of the upper catching protrusion 133 may be longer than that of the lower catching protrusion 132. For example, the upper catching protrusion 133 may be formed to have a length greater than or equal to a radius of the tunnel frame 131. The lower catching protrusion 132 may be formed to have a length less than the radius of the tunnel frame 131. A sum of the lengths of the upper catching protrusion 133 and the lower catching protrusion 132 may be less than a diameter of the tunnel frame 131. That is, a path through which the tube portion 15 passes may be formed between the upper catching protrusion 133 and the lower catching protrusion 132.

The lower catching protrusion 132 and the upper catching protrusion 133 may be formed in a space between the pair of vertical walls 131a. The lower catching protrusion 132 may have a width corresponding to a distance between the pair of vertical walls 131a. The upper catching protrusion 133 may have a width less than the distance between the pair of vertical walls 131a. Accordingly, the pair of vertical walls 131a and the upper catching protrusion 133 may be spaced apart from each other, and a space may be formed therebetween in a width direction.

Referring to FIGS. 3 and 5 to 8, the airway portion 14 may connect a mouth of the head portion 12 and the artificial lung to provide a path through which air is injected or discharged. The airway portion 14 may be fixedly connected to the head frame 121. Accordingly, when the head portion 12 rotates with respect to the body portion 11, the airway portion 14 may rotate together with the head portion 12. An end of the airway portion 14 may be inserted into an inner space of the tunnel portion 13. With the rotation of the head portion 12, the end of the airway portion 14 may rotate in the inner space of the tunnel portion 13 to open or close the tube portion 15.

The airway portion 14 may include an airway tube 141, a neutral closure portion 142, a hyperextension closure portion 143, and a connection frame 144.

The airway tube 141 may be installed to be in communication with the mouth of the head portion 12. The tube portion 15 to be described later may be connected to an end of the airway tube 141. That is, the airway tube 141 may provide a movement path of air that communicates from the mouth to the tube portion 15.

The neutral closure portion 142 and the hyperextension closure portion 143 may be connected to the outside of the airway tube 141 by the connection frame 144. The neutral closure portion 142 and the hyperextension closure portion 143 may have a traverse length. The neutral closure portion 142 and the hyperextension closure portion 143 may have a width corresponding to or less than the distance between the pair of vertical walls 131a. The neutral closure portion 142, the hyperextension closure portion 143, and the connection frame 144 may be inserted into an inner space of the tunnel frame 131.

In a state in which the airway portion 14 is inserted into the inner space of the tunnel portion 13, the neutral closure portion 142 may be positioned above the lower catching protrusion 132, and the hyperextension closure portion 143 may be positioned below the upper catching protrusion 133. The above and below may refer to upper and lower sides in a direction perpendicular to the ground, based on the state in which the CPR training apparatus for infants 1 is laid on the ground.

In a state in which the airway portion 14 is inserted into the inner space of the tunnel portion 13, the neutral closure portion 142 may be positioned relatively above and behind the hyperextension closure portion 143. The above and below may refer to upper and lower sides in a direction perpendicular to the ground, based on the state in which the CPR training apparatus for infants 1 is laid on the ground. The front and behind may respectively refer to a head side and a foot side in a height direction of a mannequin, based on the state in which the CPR training apparatus for infants 1 is laid on the ground.

The connection frame 144 may connect the neutral closure portion 142 and the hyperextension closure portion 143 to the outside of the airway tube 141. The connection frame 144 may be provided as a pair in order to connect each of opposite sides of the neutral closure portion 142 and the hyperextension closure portion 143 having a traverse length to each other, respectively.

The connection frame 144 may include a first connection frame 144a, a second connection frame 144b, and a third connection frame 144c.

The first connection frame 144a may connect one side of the airway tube 141 and the neutral closure portion 142 to each other. The first connection frame 144a may be inserted into a traverse space between the upper catching protrusion 133 and the vertical wall 131a.

The second connection frame 144b may connect the neutral closure portion 142 and the hyperextension closure portion 143 to each other. The third connection frame 144c may connect the hyperextension closure portion 143 and the other side of the airway tube 141 to each other. A connection portion between the second connection frame 144b, the hyperextension closure portion 143, and the third connection frame 144c may be formed in a round shape so as to smoothly contact a bottom surface of the tunnel frame 131 and rotate with respect to the bottom surface.

Referring to FIGS. 5 to 8, the tube portion 15 may connect the airway tube 141 and the artificial lung to each other. That is, the tube portion 15 may provide an air movement path from the airway tube 141 to the artificial lung. The tube portion 15 may pass between the neutral closure portion 142 and the hyperextension closure portion 143. Specifically, the tube portion 15 may pass through a frame formed by the neutral closure portion 142, the hyperextension closure portion 143, and the pair of second connection frames 144b. In addition, the tube portion 15 may pass through the inner space of the tunnel portion 13. Specifically, the tube portion 15 may pass through the tunnel portion 13 between the lower catching protrusion 132 and the neutral closure portion 142. In addition, the tube portion 15 may pass through the tunnel portion 13 between the upper catching protrusion 133 and the hyperextension closure portion 143. The tube portion 15 may include an elastically deformable material. Accordingly, the tube portion 15 may be closed or opened according to the contact or spacing between the lower catching protrusion 132 and the neutral closure portion 142. In addition, the tube portion 15 may be closed or opened according to the contact or spacing between the upper catching protrusion 133 and the hyperextension closure portion 143.

Hereinafter, with reference to FIGS. 6 to 8, whether the tube portion 15 is opened or closed according to an angle at which the head portion 12 is tilted with respect to the body portion 11 will be described.

FIG. 6 illustrates a state in which the tube portion 15 is closed when the head portion 12 is in a neutral state with respect to the body portion 11. The neutral state may refer to a state in which the CPR training apparatus for infants 1 is naturally laid on the ground. That is, the neutral state may refer to a state in which the head portion 12 is not tilted with respect to the body portion 11. In the neutral state, the neutral closure portion 142 may be in contact with the lower catching protrusion 132, and the hyperextension closure portion 143 may be spaced apart from the upper catching protrusion 133. According to such a state, the tube portion 15 may be closed according to the contact between the neutral closure portion 142 and the lower catching protrusion 132, and accordingly, the air movement path from the mouth to the artificial lung may be blocked. As a result, a user may not perform artificial respiration in the neutral state. In order to perform artificial respiration, the user may realize the need to tilt the head portion 12 at a predetermined angle or more with respect to the body portion 11.

FIG. 7 illustrates a state in which the tube portion 15 is opened when the head portion 12 is in a state in which the head portion 12 is tilted at a predetermined angle or more and an angle less than a hyperextension angle with respect to the body portion 11. The state in which the head portion 12 is tilted at the predetermined angle or more and the angle less than the hyperextension angle may be a state in which the head portion 12 is tilted in an angle range suitable for performing artificial respiration on an infant. For example, an angle at which a nose and ears are tilted to be perpendicular to the ground may be included in the above-described range. When the head portion 12 rotates at the predetermined angle or more with respect to the body portion 11, the neutral closure portion 142 also may rotate around the head coupling portion 131b and the head coupling hole 121b, and accordingly may be spaced apart from the lower catching protrusion 132. Accordingly, in such a state, the neutral closure portion 142 may be spaced apart from the lower catching protrusion 132 to open the tube portion 15. In addition, in the state in which the head portion 12 is tilted at the predetermined angle or more and the angle less than the hyperextension angle with respect to the body portion 11, the hyperextension closure portion 143 may remain in a state in which it is spaced apart from the upper catching protrusion 133. Accordingly, in the state in which the head portion 12 is tilted at the predetermined angle or more and the angle less than the hyperextension angle with respect to the body portion 11, the tube portion 15 may be opened, and accordingly the air movement path from the mouth to the artificial lung may be opened, thereby allowing the user to perform artificial respiration. As a result, the user may practice artificial respiration while realizing the need to tilt the head portion 12 at the predetermined angle or more with respect to the body portion 11 in order to perform artificial respiration.

FIG. 8 illustrates a state in which the tube portion 15 is closed when the head portion 12 is in a state in which the head portion 12 is tilted at a hyperextension angle or more with respect to the body portion 11. The hyperextension angle may refer to an angle at which the head portion 12 is excessively tilted with respect to the body portion 11. For example, the hyperextension angle may be set to ##degrees to ##degrees. When an actual infant's head is excessively tilted, the infant's airway may be blocked and the infant's cervical spine may be injured, so it is required to be careful not to tilt the head excessively. When the head portion 12 rotates at the hyperextension angle or more with respect to the body portion 11, the hyperextension closure portion 143 also may rotate around the head coupling portion 131b and the head coupling hole 121b, and accordingly may be in contact with the upper catching protrusion 133. The neutral closure portion 142 may be far away from the lower catching protrusion 132, and accordingly may remain in a state in which it is spaced apart from the lower catching protrusion 132. According to such a state, the tube portion 15 may be closed according to the contact between the hyperextension closure portion 143 and the upper catching protrusion 133, and accordingly, the air movement path from the mouth to the artificial lung may be blocked. As a result, the user may not perform artificial respiration in the hyperextension state. Accordingly, the user may perform training while realizing the need to tilt the head portion 12 only in a proper range with respect to the body portion 11.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A cardiopulmonary resuscitation (CPR) training apparatus for infants, comprising:
   a body portion;
   a head portion including a head frame rotatably connected to the body portion;
   a tunnel portion including a tunnel frame installed on a neck of the body portion, and an upper catching protrusion extending from an upper side of the tunnel frame toward a lower side of the tunnel frame;
   an airway portion including an airway tube installed to be in communication with a mouth of the head portion, and a hyperextension closure portion connected to an outside of the airway tube by a connection frame and positioned below the upper catching protrusion; and
   a tube portion configured to connect the airway tube and an artificial lung to each other by passing between the upper catching protrusion and the hyperextension closure portion,
   wherein the hyperextension closure portion is spaced apart from the upper catching protrusion such that the tube portion is not constricted between the hyperextension closure portion and the upper catching protrusion when the head portion is tilted backward at an angle less than a hyperextension angle with respect to the body portion, and the tube portion is constricted between the hyperextension closure portion and the upper catching protrusion when the head portion is tilted backward at the hyperextension angle or more with respect to the body portion.

2. The CPR training apparatus of claim 1, wherein
   the tunnel portion further includes a lower catching protrusion extending from the lower side of the tunnel frame toward the upper side of the tunnel frame,
   the airway portion further includes a neutral closure portion connected to the outside of the airway tube by the connection frame and positioned above the lower catching protrusion,
   the tube portion passes between the lower catching protrusion and the neutral closure portion, and
   wherein the neutral closure portion is spaced apart from the lower catching protrusion such that the tube portion is constricted between the lower catching protrusion and the neutral closure portion when the head portion is in a neutral state with respect to eh body portion, and the tube portion is not constricted between the lower catching protrusion and the neutral closure portion when the head portion is tilted backward at a predetermined angle or more with respect to the body portion.

3. The CPR training apparatus for infants of claim 2, wherein
   the tube portion is closed when the head portion is in the neutral state with respect to the body portion,
   the tube portion is opened when the head portion is tilted backward at the predetermined angle or more but less than the hyperextension angle with respect to the body portion, and
   the tube portion is closed when the head portion is tilted backward at the hyperextension angle or more with respect to the body portion.

4. The CPR training apparatus for infants of claim 3, wherein the neutral closure portion is positioned above the hyperextension closure portion and further from the head portion than the hyperextension closure portion.

5. The CPR training apparatus for infants of claim 3, wherein the lower catching protrusion is positioned further from the head portion along the tunnel portion in comparison to the upper catching protrusion.

6. The CPR training apparatus for infants of claim 3, wherein an extended length of the upper catching protrusion is longer than an extended length of the lower catching protrusion.

7. The CPR training apparatus for infants of claim 6, wherein a sum of lengths of the upper catching protrusion and the lower catching protrusion is less than a diameter of the tunnel frame.

8. The CPR training apparatus for infants of claim 1, wherein
   the tunnel portion further includes a head coupling portion protruding outwardly from each of opposite sides of the tunnel frame, and
   the head portion further includes a head coupling hole formed through each of opposite sides of a lower end of the head frame so that the head coupling portion is inserted.

9. The CPR training apparatus for infants of claim 8, wherein the head portion is rotatable with respect to the body portion and the tunnel portion using the head coupling portion and the head coupling hole as a central axis.

10. The CPR training apparatus for infants of claim 1, wherein the head portion further includes a chin frame connected to a lower end of the head frame so as to be translatable in a vertical direction with respect to the head frame.

11. The CPR training apparatus for infants of claim 10, wherein the head portion further includes:
    a guide groove formed in a longitudinal direction at each of opposite lower ends of the chin frame; and
    a chin coupling portion protruding from each of opposite lower ends of the head frame, the chin coupling portion coupled to the guide groove.

* * * * *